Patented Oct. 6, 1931

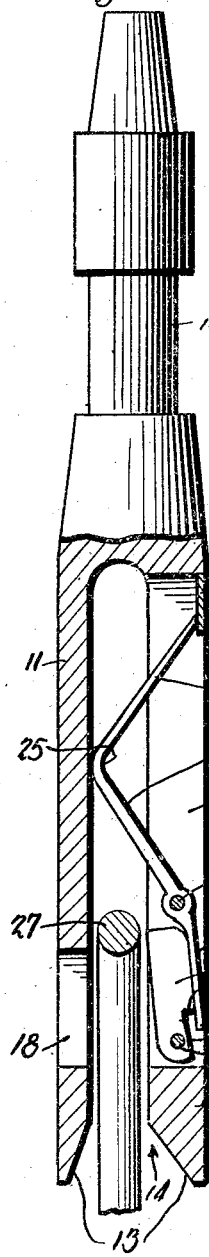
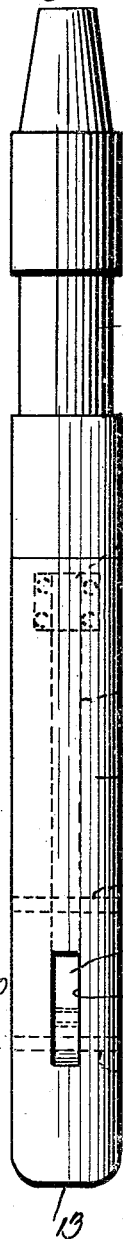
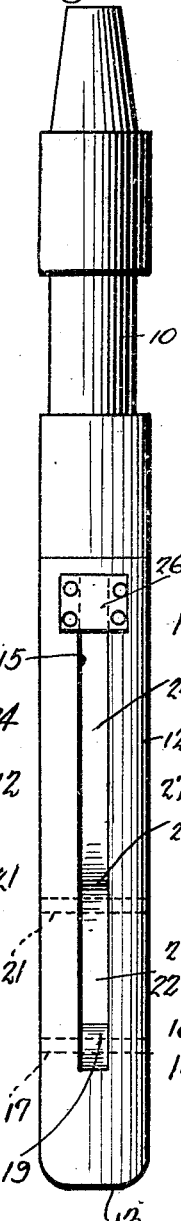
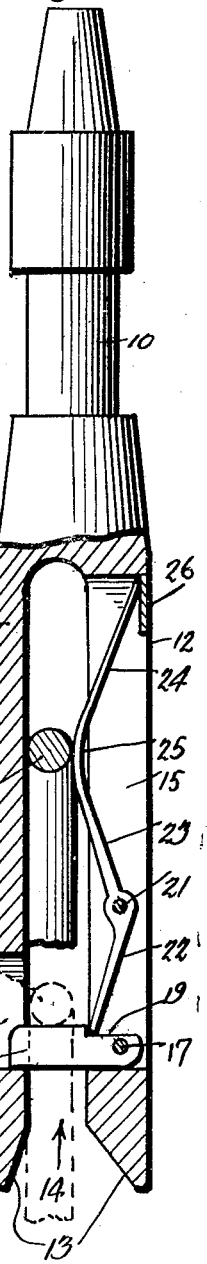

1,826,650

UNITED STATES PATENT OFFICE

ERNEST J. CARSCALLEN, OF MOHALL, NORTH DAKOTA

WELL FISHING TOOL

Application filed November 22, 1930. Serial No. 497,545.

This invention relates to certain new and useful improvements in a well fishing tool.

The primary object of the invention is to provide a fishing tool for use in wells wherein the tool to be extracted or fished from the well is equipped with a handle or bail, the fishing tool comprising a latch lever adapted to be positively shifted into position for the support of a handle, bail or the like after the latter has been received between the side legs or wings of the fishing tool.

A further object of the invention is to provide a fishing tool of the foregoing character wherein a spring device carried by the fishing tool is engaged with the latch lever for throwing the same to operative position upon engagement with said spring device of a handle, bail or other part of the well equipment being fished or extracted from the well.

With the above and other objects in view that will become apparent as the nature of the invention is better understood, the same consists in the novel form, combination and arrangement of parts hereinafter more fully described, shown in the accompanying drawings and claimed.

In the drawings:—

Figure 1 is a side elevational view of a well fishing tool constructed in accordance with the present invention, showing the side legs or wings of the tool separated at their lower ends for the free entrance of the well equipment when the fish are extracted from the well;

Figure 2 is another side elevational view of the fishing tool showing the relatively short slotted opening in one side wing into which the free end of the latch lever is received;

Figure 3 is another side elevational view of the fishing tool showing the relatively long slotted opening in the other side wing to accommodate the mounting of the spring device associated with the latch lever;

Figure 4 is a side elevational view, partly in section showing the latch lever in elevated position and the spring device associated therewith, with the tool being fished from the well illustrated as entering the lower end of the fishing tool; and Figure 5 is a sectional view, similar to Figure 4 showing the device being fished from the well engaged with the spring device for positively throwing the latch lever to its closed and supporting position and further illustrating by dotted lines, the device supported upon the latch lever.

Referring more in detail to the accompanying drawings, there is illustrated the fishing tool adapted for extracting certain equipments from wells and especially where such equipments embodies handles, bails or the like, the fishing tool comprising a shank 10 with which suitable hoist devices may be associated and carrying at the lower end of the shank a pair of side legs or wings 11 and 12 outwardly tapered at their lower ends as at 13 and defining a central longitudinally extending slot 14.

The leg or wing 12 of the fishing tool is slotted as at 15 with the slot extending from the inner end of the wing to a point adjacent the outer end thereof and in which a latch lever and an associated spring device are mounted. The latch lever 16 is pivotally mounted at one end as at 17 upon a pin extending through the side walls of the slot 15 at the lower end of the wing 12, the latch lever 16 being of a length that when swung from the position shown in Figure 4, within the slot 15 to that shown in Figure 5, to extend transversely of the opening or slot 14, to position the free end thereof upon the bottom wall of the relatively short slot 18 formed in the lower end of the leg or wing 11. The upper side of the pivoted end of the latch lever 16 is cut away as at 19 to provide an abutment shoulder 20. The spring device is mounted between the side walls of the slot 15 in the side wing 12 upon the pin 21 disposed adjacent the upper end of the latch lever 16 when the same is moved into the slot 15 and comprises a downwardly extending spring arm 22 and an upwardly extending spring arm comprising two angle sections 23 and 24 defining a bight 25 normally positioned for engagement with the inner face of the side wing 11 while the upper terminal end of the spring arm section 24 is engaged with a wear or rubbing plate 26 secured to the outer side of the fishing tool and extending across the upper end of the slot 15 as shown in Figure 3.

The inherent resiliency embodied in the spring arms 23 and 24 causes the free end of the spring arm 24 to move downwardly over the wear plate 26 toward the pivot pin 21 with the bight 25 engaged with the inner face of the side wing 11, and with the lower or downwardly extending spring arm 22 directed toward the outer side of the slot 15 as shown in Figure 4. The normal position of the latch lever 16 may extend across the opening 14 to rest upon the bottom wall of the relatively short slot 18, or the same may be moved upwardly into the slot 15 in engagement with the adjacent side of the spring arm 22 and be disposed within the slot 15. When the article to be fished from the well comprises a handle, bail or similar element, the fishing tool is lowered into engagement therewith and such member indicated by the reference numeral 27 is freely receivable into the opening 14 between the side wings 11 and 12, to open the latch lever 16 should the same be in its lowered position, the member 27 moving into the opening 14 upwardly of the latch lever for engagement with the spring arms 23 and 24. Such position is illustrated in Figure 5 wherein the spring arms 23 and 24 are illustrated as distended and with the downwardly extending spring arm 22 shifted in a direction toward the opening 14 for positively throwing the latch lever 26 into a horizontal position extending transversely of the opening 14, being limited in such movement by the lower end of the spring 22 abutting the shoulder 20 whereupon upward movement of the fishing tool will cause the member 27 to be engaged with the latch lever 16 for extraction or removal from the well. When the member 27 is disengaged from the springs 23 and 24, the latter is shifted to restore the downwardly extending spring arm 22 to the normal position shown in Figure 4, so that at the desired time, the member 27 being fished from the well may be disengaged or spaced from the latch lever 16 to permit manual shifting thereof to a releasing position as shown in Figure 4.

While there is herein shown and described the preferred embodiment of the present invention, it is nevertheless to be understood that minor changes may be made therein without departing from the spirit and scope of the invention as claimed.

I claim:—

1. A fishing tool comprising a shank having spaced wings and a latch lever pivotally carried by one wing and adapted to be moved into engagement with the other wing for the support of a device being raised, and a resilient arm carried by the tool and freely engageable with the lever for positively moving the latch lever to its device supporting position.

2. A fishing tool comprising a shank having spaced wings and a latch lever pivotally carried by one wing and adapted to be moved into engagement with the other wing for the support of a device being raised, and a spring arm carried by the tool and wipingly engaged with the lever for positively moving the latch lever to its device supporting position, when engaged by the device during coupling of the tool with the device.

3. A fishing tool comprising a shank having a pair of spaced wings, one of the wings being longitudinally slotted and the other wing having an opening therein registering with the slot, a latch lever pivoted in the lower end of the slot in position to have its free end extended to the other wing and be received in the opening, and a spring arm pivotally mounted in the slot and extending into the space between the wings, and engageable with the latch lever for positively moving the latch lever to extend across the wings when the spring arm is engaged by the device being fished from the well.

4. A fishing tool comprising a shank having a pair of spaced wings, one of the wings being longitudinally slotted and the other wing having an opening therein registering with the slot, a latch lever pivoted in the lower end of the slot in position to have its free end extended to the other wing and be received in the opening, and an angular spring mounted in the slot having one end engaged with the latch lever and its other end disposed to be engaged by a device being fished from the well for operating the spring to move the latch lever to extend across the wings for the support of said device.

In testimony whereof I affix my signature.

ERNEST J. CARSCALLEN.